Oct. 6, 1970   R. STEELE   3,532,556
PROCESS FOR FORMING PLATINUM COATED ELECTRODE
Filed Sept. 1, 1966
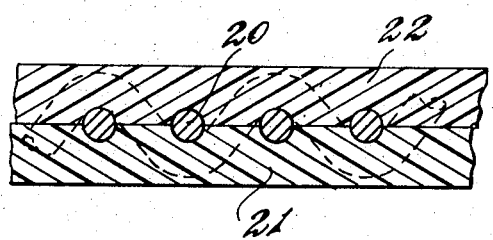
INVENTOR.
Raymond Steele
BY
ATTORNEYS 3,532,556
PROCESS FOR FORMING PLATINUM
COATED ELECTRODE
Raymond Steele, West Chester, Pa., assignor, by mesne assignments, to Matthey Bishop, Inc., Malvern, Pa., a corporation of Pennsylvania
Continuation-in-part of application Ser. No. 430,474, Feb. 4, 1965. This application Sept. 1, 1966, Ser. No. 576,681
Int. Cl. H01m 13/00
U.S. Cl. 136—120
9 Claims

ABSTRACT OF THE DISCLOSURE

A process of coating substrates with platinum and a substrate coated with platinum involving reacting a platinum type oxide with a reducing and dispersing medium composed of a $C_2$ to $C_5$ aliphatic alcohol, adding a water soluble inorganic salt or acid, removing most of the dispersion medium from the platinized substrate while retaining the platinum wet, oxidizing residual adsorbed organic matter, and removing water. The reducing and dispersing medium preferably also includes formaldehyde.

---

The present application is a continuation-in-part of my copending application, Ser. No. 430,474, filed Feb. 4, 1965 for Platinum Coating Composition, Process and Platinum Coated Materials, relevant portions of which are incorporated herein by reference.

The present invention relates to processes of coating and with platinum impregnating and to the coatings and products thus obtained. The invention is particularly adapted for making catalysts and catalytic electrodes but is not limited thereto.

A purpose of this invention is to form coatings of platinum on various substrates, particularly carbons, metals, ceramics, plastics and other carriers suitable for supporting catalysts.

A further purpose is to form coatings consisting of platinum and at least one of the other metals of the platinum group in which platinum forms at least 50% of the metal content of the coating.

A further purpose is to form platinum coatings which have a high degree of catalytic activity.

A further purpose is to form platinum coatings which are free of chloride content.

A further purpose is to avoid the need to use a damaging amount of heat in applying platinum coatings to substrates.

A further purpose is to provide supported catalysts which are particularly suitable for incorporation by known means into fuel cell and similar catalytic electrodes.

A further purpose is to simultaneously form coatings of platinum on a mixture of materials, particularly a mixture comprising an electrically conducting powder and fine particles of a plastic bonding material.

A further purpose is to provide means for incorporating the above mixture of supported platinum catalyst and plastic into an electrode structure.

A further purpose is to provide catalytic electrodes in which low concentrations of platinum are capable of imparting a high degree of catalytic activity.

The drawing shows in section an electrode which is one embodiment of the invention.

Catalytic electrodes are now under development for use in fuel cells and electrochemical processes. It has been recognized that platinum and combinations of platinum with other platinum group metals are effective catalysts for many of the reactions which take place at these electrodes. One type of catalytic electrode, sometimes referred to as a gas diffusion electrode, comprises (a) means for current collection, which may, for example, be a metal screen, (b) a catalyst, for example, platinum black, and (c) a plastic binder which also functions as a wet-proofing agent, for example, polytetrafluoroethylene. Various processes have been devised for combining these materials into catalytic electrodes. L. W. Niedrach and H. R. Alford describe one such process in A New High Performance Fuel Cell Employing Conducting, Porous Teflon Electrodes and Liquid Electrolytes, vol. 112, No. 2, Journal of The Electrochemical Society, pp. 117–124 (February 1965). British Pat. 1,025,370 also describes a method for the preparation of molded, porous catalytic electrodes.

For some purposes such as for use with an electrolyte which is substantially immobilized in a matrix, the electrodes may have a fairly open structure. For other purposes, for example, when they promote a reaction of a gaseous fuel or oxygen with a mobile, liquid electrolyte, it is important that the electrode be permeable to the gas, allow for wetting of the catalyst with electrolyte, and on the other hand prevent flooding of the catalyst and leakage of the electrolyte through the electrode.

Electrodes which employ platinum black as a catalyst are generally made in the concentration range of from 10 to 150 milligrams or more of platinum per square centimeter. Because of the high cost of platinum it is imperative that it be used very effectively and at much lower concentrations where possible. Only by making this possible can platinum catalyzed electrodes attain widespread use in such applications. Accordingly, important aims of the present invention are to extend platinum by distributing it in the form of thin coatings on supports and to provide means for combining platinum with various proportions of other metals, particularly other platinum group metals, to enhance its catalytic activity for specific electrode reactions. Extensive study has been given to conducting powders as catalyst supports. Suitable powders of this character are silver, gold, nickel, graphite, tantalum, titanium, boron carbide, and the like. Higher surface area supports such as activated carbon, silica and the like, have also been studied but they generally require mixture with more conducting powders. Conducting fabrics, for example, those of graphite carbon or carbon-silica can serve as the catalyst support and current collector. All components of a catalytic electrode must resist the corrosive action of the particular electrolyte with which it is used.

In one aspect of the invention I provide procedure for applying catalytic coatings of platinum on various supports.

Another aspect of the invention relates to coating the support material and the plastic binder particles concurrently to achieve an exceptionally high degree of dispersion of the catalytic metal through the plastic catalyst mass.

In still another aspect of the invention I make it possible to incorporate this catalyst mass including the binder into an electrode.

In my copending application, referred to above, I described a novel platinum dispersion made by reacting platinum oxide with alcohol or with a mixture of alcohol and formaldehyde. I also described means for using it to form platinum deposits on a number of substrates. A number of examples were given in which coatings of the dispersion became converted to films of platinum upon drying out in air. Various temperatures from ambient up to 700° F. or higher can be used for drying the dispersion and the choice depends upon the substrate material and other considerations. It was shown that adherent platinum deposits can even be obtained on heat sensitive materials such as plastics in this way. By repeating the application and drying out process a number of times the deposit can be built up to a desired thickness. These deposits are more catalytically active than massive or electroplated platinum and this is, in part, attributed to the smaller size of the platinum crystallites. It is appreciated that the size of these crystallities is influenced by the nature of the substrate material but it is of interest to note that the crystallite size of deposits formed from this dispersion on etched titanium sheet has been estimated to be on the order of 250 angstroms whereas the crystallite size of a platinum electrodeposit of comparable weight per unit area on another etched piece of the same titanium sheet was estimated to be greater than 1000 angstroms.

Deposits formed in the above manner from the platinum dispersion as well as the dispersion itself are the subjects of the copending application. Since these deposits combine wear resistant physical properties with an improved activity they are particularly suited for a number of purposes among which is the platinizing of titanium anodes for use in the electrolytic generation of chlorine from brine electrolyte. Other uses were shown or suggested in that application.

In forming the deposits referred to above the platinum coalesces to form a coherent and adherent coating. An apparent sintering of the platinum particles accompanies the oxidation of the last of the adsorbed organic matter, this oxidation being catalyzed by the platinum itself. Heat is generated at this stage and although the rate of heat generation may be low when the dispersion is undergoing the change to a metallic film on a relatively smooth surface such as a plastic surface, it may be significant when this change is taking place on high surface area materials such as on the fine, active powders which are often employed as catalyst supports. In this latter case an undue amount of sintering of the platinum may occur which will detract from its surface area and activity.

The process of the present invention makes use of the platinum dispersion of the prior invention, but employs a novel means for precipitating the platinum from the dispersion onto the substrate and provides for the oxidizing of organic matter adsorbed on the platinum at a slower rate and under conditions in which the heat generated is rapidly dissipated. Under these conditions the platinum undergoes less physical change and the deposit will have the appearance of platinum black. These deposits will have the high degree of activity required to catalyze oxidation and reduction reactions at fuel cell electrodes at a rapid rate.

When this prior dispersion is diluted with water little or no precipitation of platinum takes place. I find, however, that the addition of a solution of a water soluble inorganic acid, such as nitric or sulfuric acid or any other water soluble inorganic acid, or of a water soluble inorganic salt such as sodium nitrate, sodium sulphate, potassium nitrate, potassium sulphate or other water soluble inorganic salt, brings about a rapid coagulation and precipitation of the platinum. I find that if this platinum precipitate is filtered and dried at this stage the platinum will undergo some sintering and contraction and the resultant powder, when dry, will have an undesirably low surface area. This is believed to be due to oxidation in air of residual adsorbed organic matter catalyzed by the platinum itself.

I have discovered that if this precipitated platinum black is first washed free from the bulk of the mother liquor containing alcohol and/or formaldehyde, and then treated with oxygen or with an oxidizing agent while covered by water, the residual organic matter will be oxidized and the platinum can be collected and dried without undue degration. By this method I have produced platinum blacks with high surface areas in the range of 30 to 60 square meters per gram. The average crystallite size of this black has been estimated to be less than 100 angstroms.

If this dispersion is made into a slurry with a powdered substrate and water is then added, most of the platinum will simply wash off in a diluted dispersion. Surprisingly, however, I find that if a diluted water soluble inorganic acid or inorganic salt solution is added to this slurry practically all of the platinum will coagulate and firmly adhere as a coating on the substrate. If the platinum coated powder is separated from the mother liquor and dried at this stage maximum activity will not be achieved. As in the case of the platinum black described above, further improvement is effected by oxidation of residual adsorbed organic matter while the platinum coated powder is immersed in water.

It thus appears that the necessary steps for obtaining a deposit firmly adhering to a substrate with maximum surface area and high activity are as follows:

(1) The platinum dispersion in alcohol desirably with formaldehyde is brought into contact with the substrate.

(2) The platinum is coagulated on the substrate by adding a dilute solution of a water soluble inorganic acid or salt.

(3) The bulk of the alcohol (and formaldehyde) is removed and water is added to cover the platinum coated substrate.

(4) Residual organic matter adsorbed on the platinum is oxidized prior to drying the platinum.

A number of examples of the preparation of the dispersion are given below. These are taken from my copending application, Ser. No. 430,474.

The platinum oxide $PtO_2$ or $PtO \cdot H_2O$ made use of in preparing this dispersion is a brown powder sometimes called Adam's catalyst. It has largely been used in the past as a catalyst for hydrogenation of organic compounds. It is generally made by reacting chloroplatinic acid, ammonium chloroplatinate, potassium chloroplatinate or other platinum compounds with molten sodium nitrate. The chloroplatinate salts may be made to contain various amounts of other platinum group metals in which case the products will contain an intimate and sometimes advantageous mixture of the platinum group metal oxides. Platinum group metals include besides platinum also rhodium, ruthenium, iridium and palladium.

A novel process for producing platinum oxide consists of electrolyzing platinum anodically in molten sodium nitrate containing an alkali metal chloride, according to my U.S. patent application, Ser. No. 370,690, filed May 27, 1964 and now abandoned, for Process of Producing Oxides of Platinum and Palladium, and Platinum and Palladium Oxides.

An aliphatic alcohol in the range between $C_2$ and $C_5$ inclusive is employed. Suitable alcohols are ethyl, 1-propanol (normal), 2-propanol (iso), 1-butanol (normal), isobutanol, and amyl alcohol (normal), isoamyl alcohol and tertiary amyl alcohol. Denatured ethyl alcohol Formula 3A, has been used in most of the experiments. This contains 20 volumes of ethyl alcohol and one volume of methyl alcohol.

The alcohol is more preferably employed with formaldehyde, in the usual reagent form, the water solution containing 37% formaldehyde and 10 to 15% of methyl alcohol by weight. Methyl alcohol beyond that present in the formaldehyde and in the denatured ethyl alcohol is not recommended because in an experiment in which it was used the dispersion spontaneously caught fire when exposed to the air.

EXAMPLES OF MAKING THE DISPERSION

Example 1

A series of samples of platinum oxide, each weighing 2.5 grams, were placed in 50 cc. glass beakers. To each of the samples was added a solution containing 12.5 cc. of one of the alcohols listed above mixed with 12.5 cc. of formaldehyde (37% solution). Prior to adding this solution carbon dioxide was run into the covered beaker through a glass tube to expel air. This was continued during the reaction and following the reaction while the solution was cooling off. After adding the alcohol-formaldehyde solution the beaker was heated in a water bath until the reaction started. This occurred for the various samples in the range 33° to 49° C. The reaction was characterized by the evolution of gas, some foaming, a rise in temperature to the range 55° to 75° C. and a change in color as the brown platinum oxide was reduced to the black platinum dispersion. Apparently stable dispersions were obtained in every case only with small amounts of platinum settling out as residues.

These dispersions were transferred to vials and examined again after standing for 90 days. It was observed that relatively small amounts of residue were present in the preparations made with the alcohol-formaldehyde mixtures in which ethyl, 1-propanol, 1-butanol, butanol (iso) and amyl alcohol (tertiary) were employed. Those made with the mixture containing 2-propanol (iso), amyl alcohol and iso amyl alcohol had decomposed leaving the platinum in the form of a residual sludge under a clear solution.

Example 2

Further samples of platinum oxide were reacted in the manner described in Example 1 except that instead of using an alcohol-formaldehyde mixture in one case formaldehyde alone was used, in another ethyl alcohol alone was used, in another 1-propanol (normal) alone was used and in another amyl alcohol (normal) alone was used. Dispersions of platinum black were produced through reduction in the formaldehyde, the ethyl alcohol and the amyl alcohol but in these cases somewhat more platinum residue was produced than with the preparations in Example 1. All of the platinum settled out from the 1-propanol solution. When examined after 90 days it was found that very little change, if any, had occurred to the ethyl and amyl alcohol solutions. The formaldehyde solution had undergone almost complete decomposition.

Example 3

A 1.0 gram sample of platinum oxide was reacted with 5 cc. formaldehyde in the manner described in Example 1. Following the reaction the dispersion was diluted with 5 cc. of ethyl alcohol before use.

Example 4

Ten grams of platinum oxide was placed in a 200 cc. beaker and carbon dioxide was run in as in the preceding examples. Eighty cc. of ethyl alcohol was added and the beaker was heated in the water bath. The reaction began at about 60° C. and this temperature had to be maintained to enable the reaction to proceed to completion. The solution was diluted with ethyl alcohol to 138 cc. and bottled. It was noted that considerable sludge was on the bottom of the reaction beaker.

Example 5

Ten grams of platinum oxide was placed in a 200 cc. breaker. Carbon dioxide was run in as in the preceding examples. Ten cc. of formaldehyde and 90 cc. of ethyl alcohol were mixed and added to the platinum oxide. The beaker was heated in a water bath until the reaction began at about 50° C. The temperature rose to about 60° C. at which point it slowed down although the reaction was obviously incomplete. The beaker was heated further and the reaction continued with a temperature rise to 76° C. The solution was diluted with alcohol to 138 cc. (0.06 gm. Pt/cc.) and bottled. There was very little residue.

Example 6

Ten grams of platinum oxide containing 8.28 grams of platinum was placed in a 200 cc. beaker. Carbon dioxide was run in as in the preceding examples. Twenty-five cc. of ethyl alcohol and 25 cc. of formaldehyde were mixed and added to the platinum oxide. The beaker was heated in a water bath. The reaction began at 49° C. and the temperature rose to 82° C. as the reaction proceeded. The solution was diluted to 69 cc. (0.120 gm. Pt/cc.) and bottled.

Example 7

One hundred grams of platinum oxide containing 83.5 grams of platinum was placed in a 4000 cc. beaker. Five hundred cc. of ethyl alcohol and 500 cc. of formaldehyde were mixed and added to the platinum oxide. The beaker was heated in the water bath. The reaction began at 52° C. and the temperature rose to 74° C. as the reaction proceeded. When complete, the solution was cooled under carbon dioxide as usual, diluted with ethyl alcohol to 1392 cc. (0.06 gram Pt/cc.) and bottled.

Example 8

Two and five-tenths grams of a platinum-ruthenium oxide containing 2.03 grams platinum-5% ruthenium was placed in a 200 cc. beaker and moistened with 2 cc. water. Carbon dioxide was run in as in the preceding examples. Twelve and five-tenths cc. of ethyl alcohol and 12.5 cc. of formaldehyde were mixed and added. With no applied heat the reaction began in about 5 minutes at a temperature of 25° C. The temperature rose to 45° C. as the reaction proceeded. When cool, the solution was diluted with ethyl alcohol to 34 cc. (0.06 gram Pt-Ru/cc. and bottled.

Example 9

Two and five-tenths grams of platinum-rhodium oxide containing 2.10 grams of platinum-5% rhodium was placed in a 200 cc. beaker and moistened with 2 cc. water. Carbon dioxide was run in as in the preceding examples. Twelve and five-tenths cc. of ethyl alcohol and 12.5 cc. formaldehyde were mixed and added. Heating was started on the water bath. The reaction began at 28° C. and the temperature rose to 60° C. as the reaction proceeded. When cool, the solution was diluted with ethyl alcohol to 34 cc. (0.06 gm. Pt-Rh/cc.) and bottled.

Example 10

Two and five-tenths grams of platinum-iridium oxide containing 2.10 grams of platinum-5% iridium was placed in a 200 cc. beaker and moistened with 2 cc. of water. Carbon dioxide was run in as in the preceding examples. Twelve and five-tenths cc. ethyl alcohol and 12.5 cc. formaldehyde were mixed and added. Heating was started on the water bath. The reaction began at 30° C. and the temperature rose to 60° C. as the reaction proceeded. When cool, the solution was diluted with ethyl alcohol to 34 cc. (0.06 gm. Pt-Ir/cc.) and bottled.

Example 11

Two and five-tenths grams of platinum-ruthenium oxide containing 2.03 grams of platinum-15.2% ruthenium was placed in a 200 cc. beaker and moistened with 2 cc. water. Twelve and five-tenths cc. ethyl alcohol and 12.5 cc. formaldehyde were mixed and added. The reaction began immediately at about 26° C. and the temperature rose to 54° C. as the reaction proceeded. When cool the solution was diluted with ethyl alcohol to 33 cc. (0.06 gm. Pt-Ru/cc.) and bottled.

Example 12

Two and five-tenths grams of platinum-rhodium oxide containing 2.05 grams of platinum-11.6% rhodium was placed in a 200 cc. beaker and moistened with 2 cc. water. Twelve and five-tenths cc. of ethyl alcohol and 12.5 cc. formaldehyde were mixed and added. Heating was started on the water bath. The reaction began at about 40° C. and the temperature rose to 69° C. as the reaction proceeded. When cool the solution was diluted with ethyl alcohol to 35 cc. (0.06 gm. Pt-Rh/cc.) and bottled.

In most of the foregoing illustration heat was applied to initiate the reaction between platinum oxide and the alcohol or alcohol-formaldehyde reagent. Batches of platinum oxide differ somewhat in their reactivity with these reagents. In some cases no external heat is necessary. The mixed metal oxides tend to be excessively reactive and these are first moistened with water to reduce foaming. In all cases the reaction is carried out under carbon dioxide to avoid fire risk.

All of the dispersions of these examples formed adherent deposits when brushed on a platinum surface and dried out with a hot air blower. The dispersions formed with the alcohol-formaldehyde mixtures are preferred and those formed with ethyl alcohol-formaldehyde have been very convenient to use in the platinizing of various specimens for experimental trials. Relative concentrations of the alcohol and formaldehyde do not appear to be critical nor is the presence of some water in the dispersion harmful. In fact, wetting the platinum oxide prior to reacting it with alcohol-formaldehyde is a desirable precaution. Those dispersions produced in poor yield or subject to decomposition upon prolonged standing are, nevertheless, within the scope of this invention since they are capable of forming platinum deposits.

In the examples of the present invention which are given below the dispersion was formed by reacting in the proportions: 10 cc. of a 1:1 mixture by volume of ethyl alcohol (denatured Formula 3A) and formaldehyde (37% by weight of reagent) per gram of platinum oxide and in the manner of Example 7. The volume of dispersion required to form a thin slurry with a weighed amount of the substrate was predetermined and dilution of the dispersion to this volume was made with ethyl alcohol except where otherwise noted. Several graphitic carbons were used and these are characterized by their densities as determined by the Scott Volumeter and by their surface areas as determined by nitrogen adsorption using the Perkin-Elmer Shell Sorptometer. The polytetrafluoroethylene dispersion used was Teflon TFE dispersion No. 50 (O. E. du Pont de Nemours Co.).

The following patents show the making of polyeterafluoroethylene dispersions: 3,066,122; 2,965,595; 3,009,892 and 3,072,590. See also Du Pont Bulletins X–50e and X–91b. This dispersion was diluted with water. The ingredients were mixed in beakers of suitable size into which carbon dioxide was run to expel the air.

The platinum was coagulated on the substrate by dilute nitric acid, suitably 20 cc. concentrated nitric acid diluted with water to one liter.

Example 13

Fifty-six cc. of the platinum dispersion of Example 7 containing 14 grams of platinum was added to 26 grams of polypropylene powder having an average particle size of 35 microns (Hercoflat PBX–135, Hercules Powder Company), and mixed into a slurry. This was allowed to stand for about one hour during which time it was stirred occasionally. Five hundred cc. of 2% nitric acid in water was stirred in. After settling the platinized powder was filtered and washed. It was then returned to the beaker which was filled with water. Oxygen was bubbled in for two hours at a rate sufficient to keep the powder in suspension. The powder was refiltered and dried in an oven overnight at 60° C. This powder was coated with 35% of platinum. It was black in appearance. No unplatinized white particles of polypropylene could be distinguished upon examining this material under the microscope. This example illustrates that a relatively heavy deposition of platinum can be obtained by this means, even on a substrate of low surface area.

Example 14

One hundred eighty cc. of the platinum dispersion of Example 7 containing 6.6 grams of platinum was added to 60 grams of a graphite powder (density 0.15 gram/cc.; surface area 10.5 sq. meters/gram) and mixed thoroughly. This was allowed to stand for one hour during which time it was stirred occasionally. 800 cc. of 2% nitric acid solution was stirred in. After settling the platinized powder was filtered, washed and returned to the beaker which was filled with water. Oxygen was bubbled in at a sufficient rate to keep the mixture stirred for three hours. The platinized carbon thus obtained was refiltered, dried in an oven overnight and passed through a 40 mesh screen. The product contained 10% platinum by weight. It had a density of 0.22 gram/cc. and a surface area of 13.5 sq. meters/gram. Using the same graphite powder a batch containing 25% platinum was made up. This had a density of 0.23 gram/cc. and a surface area of 15.4 sq. meters/gram.

The 10% platinum-graphite powder was mixed with Teflon Dispersion #30 to form a plastic mass. This was rolled out into thin sheets and formed into catalytic electrodes in a manner similar to that described in Example 18. These electrodes were tested in a fuel cell and performed well.

Two other graphite powders having surface areas of 5.4 and 6.0 sq. meters/gram were coated with 5% platinum in the same manner. The products had areas of 10.4 and 9.7 sq. meters/gram.

Example 15

Three hundred thirty-two cc. of the platinum dispersion of Example 7 containing 7.0 grams of platinum was added to 133 grams of a colloidal graphite powder (density 0.20 gram/cc.; surface area 170 sq. meters/gram) and mixed. This was allowed to stand for one hour with occasional stirring. 800 cc. of 2% nitric acid in water was stirred in. After settling the platinized powder was filtered, washed with water and returned to the beaker and treated with oxygen for four and one-half hours with a sufficient flow to maintain stirring, the platinized powder being immersed in water the whole time. The platinized carbon was refiltered, dried in an oven overnight at 80° C. and passed through a 40 mesh screen. The product containing 5% platinum, had a density of 0.30 gram/cc. and a surface area of 217 sq. meters/gram.

This example illustrates the application of this platinum deposit to a graphite powder having a higher surface area.

Example 16

Sixty-five cc. of the dispersion of Example 7 containing 3 grams of platinum was added to 27 grams of the same graphite powder as used in Example 15. This was mixed thoroughly into a slurry and allowed to stand for one hour with occasional stirring. 500 cc. of 2% nitric acid in water was stirred in. After settling, the coated powder was filtered, washed with water and returned to a 600 cc. beaker where it was immersed in water into which oxygen was blown in adequate flow rate to stir the mix for three hours. The powder was then filtered and dried in an oven overnight at 60° C. The powder was passed through a 40 mesh screen. The surface area of this product, which contained 10% platinum by weight, was found to be 218 sq. meters/gram.

Example 17

A second sample was prepared following the identical procedure of Example 16 except that the oxidation step which had been carried on under water was omitted. The surface area of the product was found in this case to be only 185 sq. meters/gram.

Examples 16 and 17 illustrate the importance of the oxidation step in producing a product with maximum surface area.

Example 18

A 1″ x 3″ strip was cut from a piece of 50 mesh tantalum wire screen on which a visibly porous graphite powder-polytetrafluoroethylene mixture had been deposited by others. This was weighed and then immersed for 2 inches of its length in a dispersion prepared as in Example 7 and contained 0.10 grams of platinum per cc. It was then dipped into a 5% sulfuric acid solution which caused the film of platinum dispersion to coagulate as a black platinum deposit on the graphite-Teflon. This was rinsed by dipping into fresh distilled water three times.

The platinized piece was then electrolyzed anodically at 20 milliamperes until oxygen was evolved on its surface and electrolysis was continued for an additional hour. It was then thoroughly rinsed and dried in the oven overnight at 80° C. and reweighed. The weight of platinum black deposited was 20.4 milligrams.

This illustrates the platinum coating of a preformed electrode substrate by the process of this invention. It also illustrates electrolytic oxidation of residual organic matter in the platinum deposit.

Example 19

One hundred twenty cc. of the dispersion of Example 7 containing 1.5 grams of platinum was added to 28.5 grams of the colloidal graphite powder of Example 15. This was stirred for five minutes. 20 cc. of polytetrafluoroethylene dispersion (Teflon dispersion No. 30) containing 7.5 grams of polytetrafluoroethylene was stirred into the platinum-carbon mixture. This was allowed to stand for fifteen minutes after which 500 cc. of 2% nitric acid in water was stirred in. This mixture of platinum coated polytetrafluoroethylene and graphite settled out as flocs. It was filtered, washed with water and returned to the beaker where it was covered with water and oxygen was bubbled in at a rate sufficient to maintain stirring for three and one-half hours. The product was then refiltered and kneaded into a plastic mass from which excess of liquid was drained. This wet plastic catalyst mass contained about 41.7% solids.

In order to form this catalytic material into an electrode, an electrode substrate with a back-up layer of graphite-polytetrafluoroethylene was first prepared. A piece of 40 mesh per linear inch screen 20 as shown in the drawing, 5 x 4 inches in size, made from nickel wire having a diameter of 0.010 inch was cleaned in acid and then washed and coated with 16.9 milligrams of platinum by simply dipping the screen into a diluted platinum dispersion according to Example 7 and then drying with a hot air blower.

Eighty-two cc. of a diluted dispersion of polytetrafluoroethylene in water (Teflon No. 30) containing twenty grams of polytetrafluoroethylene was added to a graphite powder which had a density of 0.41 gram/cc. This mixture was thoroughly mixed and kneaded into a wet plastic mass. A portion of this mass was placed between two pieces of wet filter paper and rolled out into a thin sheet. A piece of this slightly larger than 5 x 4 inches was cut out, the wet filter paper was peeled off from one side and this one side of the plastic sheet 21 was pressed into one side of the nickel screen using a six inch Carver Laboratory Press applying 10,000 pounds pressure. The remaining piece of filter paper was rewetted and then peeled off. The screen with the thin layer of graphite-polytetrafluoroethylene mix embedded in it was dried in an oven first at 90° C. and then at 180° C. Finally it was heated in a furnace for five minutes at 650° F. The edges of the specimen were trimmed. The weight of the back-up layer was found to be 12 grams.

A portion of the wet, plastic catalyst mass was now placed between two pieces of wet filter paper and rolled out to a thin sheet in the same manner as described above for the back-up layer. A piece of the resulting sheet slightly larger than 5 x 4 inches was cut off and the wet filter paper was peeled from one side and the plastic sheet 22 was pressed into the opposite side of the same nickel screen in the manner described above for making the back-up layer. The remaining piece of paper was rewetted and peeled off. Thus the nickel screen 20 was faced on one side with a non-catalytic graphite-polytetrafluoroethylene back-up layer 21 and on the other side with a catalytic platinum-graphite-polytetrafluoroethylene layer 22. The electrode was dried at 70° C. and then heated for 15 minutes at a temperature in the range of 180 to 195° C., the edges were trimmed and the electrode was weighed. The weight of the catalyst layer was found to be 5.4 grams from which it was calculated that the platinum concentration was 2.1 milligrams per square centimeter. The electrode was cut into two pieces each 2½ x 4". The initial bubble pressure for oxygen of one of these was found to be about 1 inch of mercury. The two electrodes were installed in a small fuel cell the electrolyte chamber of which measured 1½ inches in diameter by ⅛ inch between electrodes. A water solution containing 300 grams per liter of potassium hydroxide was used as an electrolyte. Hydrogen was passed through the 1½ inches diameter compartment behind one electrode and oxygen at approximately 1 inch of mercury pressure was passed through a similar compartment behind the other electrode. The two face plates between which the assembly was compressed had heating pads at their outer surfaces as well known. Good results were obtained.

Current and voltage readings taken at several temperatures are tabulated below:

| | Cell voltage, millivolts | | |
|---|---|---|---|
| | 80° F. | 135° F. | 170 °F. |
| Current milliamperes: | | | |
| 800 | 790 | 840 | 860 |
| 1,000 | 760 | 815 | 385 |
| 1,200 | 730 | 795 | 820 |
| 1,400 | 705 | 780 | 795 |
| 1,600 | 680 | 760 | 780 |
| 1,800 | 650 | 740 | 760 |
| 2,000 | | 720 | 730 |

The platinum coated graphite powders of Examples 14, 15 and 16 and other powders similarly coated, are very suitable for incorporation into catalytic electrodes by known methods. Alternative means for incorporating the active platinum catalysts of this invention into electrodes are illustrated in Examples 18 and 19.

The invention is not limited as to whether the deposit includes only platinum or platinum with less than 50% of at least one metal of the class consisting of rhodium, ruthenium, iridium, palladium and mixtures thereof, as set forth in Examples 8 to 12 inclusive. The platinum dispersion can be made to include various amounts of the other platinum group metals just mentioned in combination with more than 50% platinum and any of these combinations can be deposited on substrates in the manner described in the present invention.

The invention is not limited as to whether the dispersion used contains only platinum group metals. The dispersion of this invention can be mixed with a dispersion of polytetrafluoroethylene and compatible dispersions of graphite or metals may be included. Deposits of mixed composition can thus be obtained on substrates by techniques such as that of Example 18.

The invention is not limited with respect to the volume of dispersion used to contact the substrate in forming the slurry in the initial step of the process of the invention. It is contemplated that, without limiting the invention, special volume relations may be unusually suitable to produce the desired deposit on particles having certain surface areas, particle sizes or densities.

The invention is not limited with respect to the particular inorganic water soluble acid or inorganic water soluble salt solution used to coagulate the platinum coating on the substrate. It is contemplated that certain acids or salts may be particularly advantageous in special cases but in general any inorganic acid or salt which is soluble in water and which will not corrode the substrate or degrade the catalyst can be used.

It will be evident that the residual organic matter in the platinum can be oxidized prior to drying by simply exposing to oxygen or air while it is immersed in water or in a water solution of an acid or salt. Alternatively oxidizing agents such as hydrogen peroxide can be used or the oxidizing step can be carried out electrolytically.

Any one of a wide variety of substrates is successfully coated according to the invention including a wide variety of metals previously mentioned and other electrically conducting powders such as graphite, and also various plastics such as polytetrafluoroethylene, chlorotrifluoroethylene, polyethylene and the like. Well known catalyst carriers such as activated aluminas, silica-alumina, carbons and other materials can be platinum coated in this manner. The substrates on which deposits are made can be in the form of powders, granules, pelletized materials, solid materials and the like.

It will be evident that some of the substrates coated as described are particularly suitable for use as electrocatalysts, but they can also be used for catalysts in a variety of other operations. Others, while not suitable electrocatalysts, may be suitable for catalyzing other processes.

In view of my invention and disclosure variations and modifications to meet individual whim or particular need will doubtless become evident to others skilled in the art, to obtain all or part of the benefits of my invention without copying the process and product shown, and I therefore claim all such insofar as they fall within the reasonable spirit and scope of my claims.

Having thus described my invention what I claim as new and desire to secure by Letters Patent is:

1. A process for depositing catalytically active, adherent platinum and combinations of platinum with less than 50% of other platinum group metals, which comprises reacting an oxide of the class consisting of platinum oxide and mixtures of platinum oxide with at least one oxide of the class consisting of rhodium oxide, ruthenium oxide, iridium oxide and palladium oxide and mixtures thereof, in which platinum forms at least 50% of the metal content, with a reducing and dispersing medium essentially including an aliphatic alcohol between $C_2$ and $C_5$ inclusive to form a dispersion of platinum, contacting a substrate with the platinum dispersion, adding a solution of the class consisting of a water soluble inorganic salt and a water soluble inorganic acid to precipitate platinum from the dispersion on to the substrate, removing most of the dispersion medium from the platinized substrate while retaining the platinum wet, oxidizing residual adsorbed organic matter in the platinum deposit while retaining the platinum wet, and removing water from the platinized substrate.

2. A process of claim 1, which comprises bringing oxygen into contact with the wet platinum deposit to oxidize organic matter.

3. A process of claim 1, which comprises coating a plurality of different substrates together with platinum to form a catalytic mixture.

4. A process of claim 1, in which one of the substrates is graphite and another substrate is polytetrafluoroethylene.

5. A process of claim 1, which comprises reacting with a reducing and dispersing medium also essentially including formaldehyde.

6. A process of claim 5, which comprises bringing oxygen into contact with the wet platinum deposit to oxidize organic matter.

7. A process of claim 5, which comprises coating a plurality of different substrates together with platinum to form a catalytic mixture.

8. A process of claim 7, in which one of the substrates is graphite and another substrate is polytetrafluoroethylene.

9. A process of forming an electrode, which comprises depositing platinum on electrically conducting particles and on particles of a plastic substrate according to claim 7, molding the different particles into firm engagement with an electrically conducting base, and heating the plastic substrate to bond the different particles to the base.

References Cited

UNITED STATES PATENTS

| | | | |
|---|---|---|---|
| 3,099,575 | 7/1963 | Hill | 117—212 |
| 3,282,735 | 11/1966 | Kring et al. | 136—120 X |
| 3,305,400 | 2/1967 | Barber et al. | 136—122 X |

WINSTON A. DOUGLAS, Primary Examiner

O. F. CRUTCHFIELD, Assistant Examiner

U.S. Cl. X.R.

117—227; 252—472